United States Patent
Cho et al.

(10) Patent No.: US 6,916,753 B2
(45) Date of Patent: Jul. 12, 2005

(54) $TM^{3+}$-DOPED SILICATE GLASS AND THE USE THEREOF

(75) Inventors: Doo Hee Cho, Daejon (KR); Yong Gyu Choi, Daejon (KR); Hong Seok Seo, Daejon (KR); Bong Je Park, Busan (KR)

(73) Assignee: Electronics and Telecommunications Research Institute, Daejon (KR)

( * ) Notice: Subject to any disclaimer, the term of this patent is extended or adjusted under 35 U.S.C. 154(b) by 212 days.

(21) Appl. No.: 10/331,353

(22) Filed: Dec. 31, 2002

(65) Prior Publication Data

US 2003/0207746 A1 Nov. 6, 2003

(30) Foreign Application Priority Data

May 6, 2002 (KR) ................................. 10-2002-0024689

(51) Int. Cl.⁷ ............................. C03C 4/12; C03C 3/112
(52) U.S. Cl. .............................. 501/57; 501/64; 501/54; 501/72; 252/301.4 F; 252/301.4 H; 428/426; 428/427; 428/428; 385/142; 385/144
(58) Field of Search ............................. 501/57, 64, 54, 501/72; 252/301.4 F, 301.4 H; 428/426, 427, 429; 385/142, 144

(56) References Cited

U.S. PATENT DOCUMENTS

| | | |
|---|---|---|
| 5,067,134 A | 11/1991 | Oomen |
| 5,251,062 A | 10/1993 | Snitzer et al. |
| 5,366,937 A | 11/1994 | Schneider et al. |
| 6,128,430 A * | 10/2000 | Chu et al. ................... 385/142 |
| 6,287,993 B1 * | 9/2001 | Fu et al. ........................ 501/5 |

OTHER PUBLICATIONS

Brian Cole, et al.; "S–band amplification in a thulium doped silicate fiber"; OFC 2001; pp. TuQ3–1–3.

Mira Naftaly, et al.; "$Tm^{3+}$–doped tellurite glass for a broadband amplifier at 1.47 $\mu$m"; Applied Optics; vol. 39, No. 27; Sep. 20, 2000; pp. 4979–4984.

T. Komukai, et al.; "1.47 $\mu$m Band $Tm^{3+}$Doped Fluoride Fibre Amplifier Using a 1.064 $\mu$m Upconversion Pumping Scheme"; Electronics Letters; Jan. 7, 1993; vol. 29, No. 1; pp. 110–112.

* cited by examiner

*Primary Examiner*—C. Melissa Koslow
(74) *Attorney, Agent, or Firm*—Mayer, Brown, Rowe & Maw LLP

(57) ABSTRACT

The present invention is a thulium doped silicate glass having an excellent fluorescent emission in the 1.4 $\mu$m band, and the usage thereof. The silicate glass of this invention includes: 65~95 mol % $SiO_2$; 0.5~30 mol % bivalent metal oxide consisting of one or more material selected from ZnO, BaO, SrO and PbO; and 1~15 mol % of $SnO_2$ or $TiO_2$, wherein 3~30 mol % oxygen of the glass composition are replaced with fluorine, and 0.01~1 mol % of thulium ions are doped, and the fluorescence lifetime of the $^3H_4$ level of the $Tm^{3+}$ is more than 50 $\mu$s. The silicate glass can be easily formed into a waveguide, such as optical fiber, and it has an excellent ability to splice with the optical fiber for transmission. They have excellent chemical durability and the characteristic of 1.4 $\mu$m band fluorescent emission by suppressing the non-radiative transition through multi-phonon relaxation. Thus they have long fluorescence lifetime of the $^3H_4$ of $Tm^{3+}$.

8 Claims, No Drawings

TM$^{3+}$-DOPED SILICATE GLASS AND THE USE THEREOF

FIELD OF THE INVENTION

The present invention relates to a Tm$^{3+}$-doped silicate glass and the usage thereof: and, more particularly, to a Tm$^{3+}$-doped silicate glass having an excellent fluorescent emission in the S-band, and the usage of the Tm$^{3+}$-doped silicate glass.

DESCRIPTION OF RELATED ART

Since a wavelength division multiplexing (WDM) optical communication system was developed, the wavelength bandwidth of the optical communication has been stimulated to be expanded. At present C-band (1530~1570 nm) is widely used, and an L-band (1570~1610 μm) is used in WDM optical communications gradually. However, the two bands account for less than a quarter of the low-loss transmission window of a silicate optical fiber.

Recently an efficient optical amplifier of another band has been developed and the transmission wavelength bandwidth has been extended remarkably. A thulium doped fiber amplifier (TDFA) that can be used in the so-called S-band (1450~1530nm) was developed. Since the TDFA using the transition of Tm$^{3+}$: $^3H_4 \rightarrow {}^3F_4$ was realized by Komukai et al., which is disclosed in an article entitled "1.47 μm band Tm$^{3+}$ doped fluoride fiber amplifier using a 1.064 μm upconversion pumping scheme, *Electronics Letters* Vol. 29 No. 1, in January, 1993, the wavelength bandwidth of the TDFA was extended and the optical gain was raised by using various kinds of pump light sources. However, a TDFA uses Tm$^{3+}$-doped fluoride glass fiber as a gain medium, thus its poor long-term stability and difficulties in fiber fabrication are pointed as problems.

The $^3H_4 \rightarrow {}^3F_4$ transition of Tm$^{3+}$ ion is usually used for the active transition of the S-band. The energy levels of the thulium ions are consist of $^3H_6$, $^3F_4$, $^3H_5$, $^3H_4$, $^3F_3$ and $^1G_4$. Since there is $^3H_5$ between $^3H_4$ and $^3F_4$ and the energy gap between the $^3H_4$ and $^3H_5$ is about 4000 cm$^{-1}$, the $^3H_4 \rightarrow {}^3F_4$ transition is near non-radiative transition through multi-phonon relaxation in the high phonon energy glass such as a silicate glass. So, the fluorescence lifetime of the $^3H_4$ level is very short and the fluorescent emission is very weak. Accordingly, the silicate glass could not be used as a fiber amplifier or a fiber laser medium. The fluorescence of the thulium ion doped in a silica glass medium is reported to be less than 20 μs. For this reason, it has been thought so far that a material having low phonon energy, such as fluoride glass, tellurite glass and heavy metal oxide glass, should be used as a matrix glass for the conventional TDFA in order to use the 1.4 μm band fluorescence of the Tm$^{3+}$ ions.

However, it is hard to manufacture the special glasses into an optical waveguide, e.g., an optical fiber, compared to a silicate glass. They have poor chemical durability and waterproofness. Accordingly, there are many problems in applying the special glasses to optical communication devices.

The silicate glass based on quartz glass used for the fiber amplifiers or fiber lasers can be easily fabricated into optical fibers, and it has excellent chemical stability, durability and optical transmittance. So, high long-term reliability is expected when the silicate glass is used as an optical device in optical communications. If the non-radiative transition through the multi-phonon relaxation due to high phonon energy of the glass matrix is suppressed, the fluorescence lifetime of the $^3H_4$ level can be extended.

In 2001, a research group of Corning and Naval Res. Lab have fabricated a Tm$^{3+}$-doped silicate fiber and manufactured an S-band fiber amplifier. They, however, failed to obtain sufficient optical gain with a modest pumping power due to short fluorescence lifetime of the $^3H_4$ level.

U.S. Pat. No. 5,251,062, issued on Oct. 5, 1993, by Elisa Snitzer, Eva M. Vogel and Jau-Sheng Wang, discloses a tellurite glass applicable to a solid laser oscillator an optical amplifier. The patent discloses glasses having composition of TeO$_2$ 58~84 mol %, Na$_2$O 0~24 mol %, and ZnO 10~30 mol %. The glass composition of U.S. Pat. No. 5,251,062 is favorable to the fabrication of optical fiber, and it is easy to make the refractive index difference between core and cladding. The glass having a composition with Tm$^{3+}$ ions is good to obtain fluorescent emission in the 1.4 μm band. However, the glass having the composition with Tm$^{3+}$ ions does not have long-term durability and it can be hardly fabricated into an optical waveguide such as optical fiber compared to a silicate glass.

U.S. Pat. No. 5,366,937, issued on Nov. 22, 1994, by H. Schneider et al., describes thulium-doped glass fabricated into optical fiber. As a glass matrix, heavy metal fluoride glasses are predominantly used, and terbium (Tb), holmium (Ho), europium (Eu) and praseodymium (Pr) are doped selectively to obtain the fluorescence in the 1.4 μm band more efficiently. However, it has a problem in chemical durability and the fabrication of optical fiber, because heavy metal fluoride glasses are used as glass matrix.

U.S. Pat. No. 5,067,134, issued on Nov. 19, 1991, by E. W. J. L. Oomen discloses an optical fiber laser using the fiber made of thulium-doped heavy metal fluoride glass. The wavelength of the laser is around 450 nm . Since the laser medium uses a heavy metal fluoride glass, the fluorescence lifetime of the $^3H_4$ level is long, however, it has problems in chemical durability and the fabrication of optical fiber.

SUMMARY OF THE INVENTION

It is, therefore, an object of the present invention to provide a thulium-doped silicate glass that can be used for a fiber amplifier or a fiber laser of the 1.45~1.52 μm band by solving its problem of short fluorescence lifetime of the $^3H_4$ level.

It is another object of the present invention to provide a thulium-doped silicate glass, which has high waterproofness and chemical durability and is not crystallized or phase separated during the optical fiber fabrication process at a high temperature.

The present invention relates to a thulium-doped silicate glass that can be used for a fiber amplifier or a fiber laser in the S-band (1450~1530 nm), more particularly, to a silicate glass having 0.01~1 mol % Tm$^{3+}$ ions as active ions, and the usage of the thulium-doped silicate glass.

In accordance with an aspect of the present invention, there is provided a thulium-doped silicate glass, including:

65~95 mol % $SiO_2$; 0.5~30 mol % bivalent metal oxide consisting of one or more material selected from ZnO, BaO, SrO and PbO; and 1~15 mol % of $SnO_2$ or $TiO_2$, wherein 3~30 mol % oxygen of the glass composition are replaced with fluorine, and 0.01~1 mol % of thulium ions are doped, and the fluorescence lifetime of the $^3H_4$ level of the $Tm^{3+}$ is more than 50 μs.

The thulium-doped silicate glass further includes: 0.5~5 mol % alkali metal oxide consisting of one or more material selected from $K_2O$, $Rb_2O$ and $Cs_2O$; and 1~15 mol % trivalent metal oxide consisting of one or more material selected from $In_2O_3$ and $Sb_2O_3$.

In accordance with another aspect of the present invention, there is provided a thulium-doped silicate glass as described above, wherein the silicate glass is used for a laser oscillator, optical fiber laser, optical fiber amplifier, or planar waveguide optical amplifier.

In accordance with another aspect of the present invention, there is provided an optical fiber, including: a core having the glass composition described above and a cladding having a lower refractive index than the core.

DETAILED DESCRIPTION OF THE INVENTION

Other objects and aspects of the invention will become apparent from the following description of the embodiments with reference to the accompanying drawings, which is set forth hereinafter.

$SiO_2$ used in the silicate glass of the present invention is a basic element of a glass network former. The $SiO_2$ has high chemical durability, optical transmission. However, as described before, due to its high phonon energy (1100 cm$^{-1}$), when it forms a glass matrix alone, the fluorescent emission in the 1.4 μm band by the $^3H_4 \rightarrow ^3F_4$ transition of $Tm^{3+}$ ions is degraded remarkably, and the doping amount of rare earth ions is limited to very low level.

To solve these problems, $SnO_2$ or $TiO_2$ added in the composition of a glass is suggested in the present invention. The $SnO_2$ or $TiO_2$ which is a material having a characteristic between the glass network former and modifier reduces the phonon energy of the glass and raises the refractive index of the glass. The above effects can be confirmed when $SnO_2$ or $TiO_2$ is added more than 1 mol %. If $SnO_2$ or $TiO_2$ is added more than 15 mol %, the silicate glass becomes phase-separated. Accordingly, it should not be added too much.

Also, one or more bivalent metal oxides selected from a group consisting of ZnO, SrO, BaO and PbO is a glass network modifier. It reduces the melting point of the glass, makes the doping of rare-earth ions easier, and raises the refractive index of the glass. The phonon energy of the glass is reduced by selecting the modifying ion with heavy atomic weight. When the amount of the modifying ions is too small, the desired effects do not appear. If they are added too much, the glass structure becomes weak and the chemical durability is lowered remarkably. The amount of the additive amount to the glass structure is 0.5~30 mol %.

One or more alkali metal oxide selected from a group consisting of $K_2O$, $Rb_2O$ and $Cs_2O$ could be added to the glass matrix to lower the melting point of the glass and ease the addition of rare earth ions. They are not essential elements to achieve the object of the present invention. However, when they are added, the lifetime extending effects are enhanced. If the alkali oxide is added too much, it lowers the melting point of the glass excessively and reduces the fluorescent lifetime of the $^3H_4$ level. Therefore, it is desirable to add the alkali metal oxide less than 5 mol %.

Trivalent metal oxides, such as $In_2O_3$ or $Sb_2O_3$ have a characteristic between the glass network former and the modifiers. They lower the phonon energy of the glass, raise the refractive index of the glass, and make the doping rare earth ions easier. Thus the lifetime extending effects are enhanced when they are added in a small amount. Like $TiO_2$ and $SnO_2$, $In_2O_3$ and $Sb_2O_3$ may cause phase separation when they are added to the silicate glass too much. Therefore, it is desirable to add the trivalent metal oxide no more than 10 mol %.

In accordance with the present invention, 3 to 30 mol % of oxygen is replaced with fluorine in the silicate glass. This lowers the phonon energy of glass matrix and raises the fluorescence lifetime of the $^3H_4$ level of $Tm^{3+}$ ions. Here, the fluorine substitution may be accomplished by substitution of metal fluorides for parts of the metal oxides in the melting and quenching method, or by mixing fluorine gas in a deposition method such as MCVD method. When the amount of the substituted fluorine is less than 3 mol %, the effect of enhancing the fluorescence lifetime is not remarkable. If the amount of substituted fluorine is more than 30 mol %, the glass structure becomes too weak, thus dropping the chemical durability considerably.

The $Tm^{3+}$ ion of an active ion generating fluorescence in the 1.4 μm band is doped into the matrix glass of the present invention. In order to generate 1.4 μm fluorescence, at least 0.01 mol % of $Tm^{3+}$ should be doped in the form of an oxide. However, when it is added too much, the $Tm^{3+}$ ions are agglomerated each other, so the fluorescence lifetime is largely reduced. Therefore, it is desirable to add the $Tm^{3+}$ ion no more than 1 mol %.

When a certain transition of a rare earth ion is used for an optical amplifier or a laser, the upper levels of the ion should have long fluorescence lifetime and large emission cross-section of the transition. Then the high efficiency of the laser or the optical amplifier can be attained. The $Tm^{3+}$: $^3H_4 \rightarrow ^3F_4$ transition having a center wavelength of approximately 1470 nm can be applied to an optical amplifier in the 1450~1520 nm band. Generally, the fluorescence lifetime of the $^3H_4$ level of $Tm^{3+}$ ion doped into the silica glass is less than 20 μs, and the fluorescence lifetime of the $^3H_4$ level of $Tm^{3+}$ ion is approximately 30 μs in the soda-lime silicate glass. This is very small compared to that of the $^3H_4$ level of $Tm^{3+}$ ion doped into the fluoride glass commonly used for the TDFA. The lifetime of the $^3H_4$ level of $Tm^{3+}$ ion doped into the fluoride glass is about 1 ms. So, generally silicate glass is not proper for the medium glass of the TDFA.

However, the glass having a composition of 70$SiO_2$-5$TiO_2$-2$Sb_2O_3$-10$ZnF_2$-10$PbF_2$-3KF and doped with 0.2 mol % $Tm_2O_3$, which is an example of the glasses fabricated in accordance with the present invention, represents 180 μs of the fluorescence lifetime of the $^3H_4$ level. This is long enough to be used as a medium glass of the TDFA. The fluorescence lifetime could be extended because the cations of heavy atomic weights and fluorine ions are preferentially coordinated around the $Tm^{3+}$ ions to reduce the phonon energy affecting the fluorescence lifetime directly. This reduces the non-radiative transition rate. The intrinsic lifetime is considered to increase by doping of the heavy metal oxides and fluorine because the local crystal field around the $Tm^{3+}$ ions is reduced.

In accordance with the present invention, glasses can be fabricated in two methods: a melting and quenching method and a vapor deposition method. In the melting and quenching method, highly pure powders of oxide, carbohydrate and fluoride materials are mixed in solid phase, melted at a high temperature at higher than 1500 C. The melt is cooled down gradually and annealed, then formed into a bulk glass. The bulk glass fabricated as the above method is formed into a cylindrical glass using a core drilling, and then it is formed into a preform including core and cladding by a rod-in-tube method.

In the vapor deposition method like a modified chemical vapor deposition (MCVD) or vapor phase axial deposition (VAD) method, a porous glass preform is formed of such materials as $SiO_2$, $TiO_2$, $SnO_2$ and F that can be deposited easily. Then, the porous glass preform is dipped in a solution containing $Tm^{3+}$ ion and the rest materials, and is sintered at a high temperature to be vitreous preform.

A thulium doped optical fiber can be obtained by heating the cylindrical preform at the end in the optical fiber drawing apparatus and drawing the softened glass at a high speed to form the fiber.

Hereinafter, an embodiment of the present invention, $Tm^{3+}$-doped silicate glass will be described more in detail. The following embodiments are mere examples for describing the present invention, and any description in the embodiment of the present invention should not be construed to define or limit the scope of the invention.

Embodiments 1–2

Glass samples having a composition with 0.2 w % of $Tm_2O_3$ shown in table 1 are prepared by the following method. Powder materials having 99.9% purities are weighed and mixed, then melted in the air at 1500 C for one hour and cooled down rapidly, and then annealed at 600 C for 30 minutes to form bulk glasses.

The glass samples are cut and polished. Then, the fluorescence lifetime of the $^3H_4$ of $Tm^{3+}$ ion is measured at 1470 nm by using a 795 nm Ti: sapphire laser, band pass filters, a chopper wheel, an InSb detector and a digital oscilloscope. The results are shown in the table 1.

Comparative Embodiments 1–2

To compare the glasses of the present invention with the conventional soda-lime silicate glasses, they are formed in the same method as the embodiments 1–2. The soda-lime silicate glass compositions are shown in the table 1. Then, the fluorescence lifetime of the $^3H_4$ of $Tm^{3+}$ is measured in the same method described in the embodiments 1–2. The result is shown in the table 1.

TABLE 1

Composition of glass samples and fluorescence lifetimes of the embodiments 1–2 and comparative embodiments 1–2

| | Composition of Glass Sample | Fluorescence Lifetime of $Tm^{3+}$:$^3H_4$. |
|---|---|---|
| Comp. Embodiment 1 | 70$SiO_2$ 15Na$O_½$ 15CaO | 33 μs |
| Comp. Embodiment 2 | 70$SiO_2$ 15K$O_½$ 15ZnO | 35 μs |
| Embodiment 1 | 70$SiO_2$ 5$SnO_2$ 15BaO 10PbO | 47 μs |
| Embodiment 2 | 70$SiO_2$ 5$SnO_2$ 15PbO 5ZnO 15$ZnF_2$ | 75 μs |

The result of the table 1 shows that the fluorescence lifetimes of the $^3H_4$ level of the glasses of the present invention are increased remarkably compared to the conventional soda-lime silicate glass. Also, it shows that the fluorine substitution enhances the fluorescence lifetime of the $^3H_4$ level.

Embodiments 3–6

Glass samples having compositions shown in a table 2 with 0.2 w % of $Tm_2O_3$ are prepared by the following method. Powder materials having 99.9% purities are weighed and mixed, then melted in the air at 1500 C for one hour and cooled down rapidly, and then annealed at 600 C for 30 minutes to form bulk glasses.

The glass samples are cut and polished. Then, the fluorescence lifetime of the $^3H_4$ of $Tm^{3+}$ ion is measured at 1470 nm by using a 795 nm Ti: sapphire laser, band pass filters, a chopper wheel, an InSb detector and a digital oscilloscope. The results are shown in the table 2.

TABLE 2

$Tm^{3+}$:$^3H_4$ fluorescence lifetime of $Tm_2O_3$-doped fluore substitution silicate glass

| | Composition of Glass Sample | Fluorescence Lifetime of $Tm^{3+}$:$^3H_4$. |
|---|---|---|
| Embodiment 3 | 70$SiO_2$ 5$TiO_2$ 2$Sb_2O_3$ 10ZnO 10PbO 3K$O_½$ | 56 μs |
| Embodiment 4 | 70$SiO_2$ 15$TiO_2$ 2$Sb_2O_3$ 10ZnO 10PbO 3KF | 99 μs |
| Embodiment 5 | 70$SiO_2$ 5$TiO_2$ 2$Sb_2O_3$ 10$ZnF_2$ 10PbO 3KF | 170 μs |
| Embodiment 6 | 70$SiO_2$ 5$TiO_2$ 2$Sb_2O_3$ 10$ZnF_2$ 10$PbF_2$ 3KF | 180 μs |

The result of the table 2 shows that the more the amount of fluore substitution can extended the fluorescence lifetime of the $^3H_4$ level. Therefore, it shows that the glass having the composition of the present invention has excellent spectral properties as a medium glass of the TDFA.

When the glass of the present invention is used as a medium glass of the TDFA or a fiber laser, the fabrication process is controlled easily compared to the fluoride and tellurite glass. Moreover, it has excellent chemical durability and the longer fluorescence lifetime of the $^3H_4$ level compared to the conventional silicate glass. Therefore, the glass composition of the present invention can realize a highly efficient TDFA or fiber laser.

The glasses of the present invention are silicate glasses of new compositions to be used for a medium glass of a TDFA or fiber laser. They are the silicate glass that can be formed into a waveguide, such as an optical fiber, easily compared to the conventional $Tm^{3+}$-doped fluoride glasses, tellurite glasses and heavy metal oxide glasses. They have an excellent ability to splice with the optical fiber for transmission. They have excellent chemical durability and the characteristic of 1.4 μm band fluorescent emission by suppressing the non-radiative transition through multi-phonon relaxation. Thus they have long fluorescence lifetime of the $^3H_4$ of $Tm^{3+}$.

While the present invention has been described with respect to certain preferred embodiments, it will be apparent to those skilled in the art that various changes and modifications may be made without departing from the scope of the invention as defined in the following claims.

What is claimed is:

1. A thulium doped silicate glass, comprising:
   65~95 mol % $SiO_2$;
   0.5~30 mol % bivalent metal oxide consisting of one or more material selected from ZnO, BaO, SrO and PbO; and
   1~15 mol % of $SnO_2$ or $TiO_2$,
   wherein 3~30 mol % oxygen of the glass composition are replaced with fluorine, and 0.01~1 mol % of thulium ions are doped, and the fluorescence lifetime of the $^3H_4$ level of the $Tm^{3+}$ is more than 50 μs.

2. The glass as recited in claim 1, further comprising: 0.5~5 mol % alkali metal oxide consisting of one or more material selected from $K_2O$, $Rb_2O$ and $Cs_2O$.

3. The glass as recited in claim 1, further comprising: 1~15 mol % trivalent metal oxide consisting of one or more material selected from $In_2O3$ and $Sb_2O_3$.

4. The glass as recited in claim 1, further comprising: 0.5~5 mol % alkali metal oxide consisting of one or more material selected from $K_2O$, $Rb_2O$ and $Cs_2O$; and 1~15 mol % trivalent metal oxide consisting of one or more material selected from $In_2O_3$ and $Sb_2O_3$.

5. An optical fiber, comprising: a core having the same composition recited in claim 1 and a cladding having a lower refractive index than the core.

6. The optical fiber as recited in claim 5, wherein the core further comprises: 0.5~5 mol % alkali metal oxide consisting of one or more material selected from $K_2O$, $Rb_2O$ and $Cs_2O$.

7. The optical fiber as recited in claim 5, wherein the core further comprises: 1~15 mol % trivalent metal oxide consisting of one or more material selected from $In_2O_3$ and $Sb_2O_3$.

8. The optical fiber as recited in claim 5, wherein the core further comprises:
   0.5~5 mol % alkali metal oxide consisting of one or more material selected from $K_2O$, $Rb_2O$ and $Cs_2O$; and 1~15 mol % trivalent metal oxide consisting of one or more material selected from $In_2O_3$ and $Sb_2O_3$.

* * * * *